United States Patent
Dhillon

(10) Patent No.: US 11,206,284 B2
(45) Date of Patent: Dec. 21, 2021

(54) AUTOMATED THREAT ANALYSIS OF A SYSTEM DESIGN

(71) Applicant: EMC IP Holding Company LLC, Hopkinton, MA (US)

(72) Inventor: Danny V. Dhillon, Bothell, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 304 days.

(21) Appl. No.: 16/530,437

(22) Filed: Aug. 2, 2019

(65) Prior Publication Data
US 2021/0037046 A1 Feb. 4, 2021

(51) Int. Cl.
H04L 29/06 (2006.01)

(52) U.S. Cl.
CPC ...... *H04L 63/1441* (2013.01); *H04L 63/1416* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | |
|---|---|---|
| 9,195,573 B1 | 11/2015 | Giammaria et al. |
| 9,652,618 B1 | 5/2017 | Lerner |
| 9,996,064 B1 | 6/2018 | Finegan |
| 10,282,550 B1 | 5/2019 | Sheridan et al. |
| 2007/0156727 A1 | 7/2007 | Lim |
| 2007/0157174 A1 | 7/2007 | Gebhardt et al. |
| 2009/0265209 A1 | 10/2009 | Swaminathan et al. |
| 2013/0104236 A1* | 4/2013 | Ray ..................... H04L 63/1408 726/25 |
| 2015/0040231 A1* | 2/2015 | Oliphant ................. G06F 21/50 726/25 |
| 2015/0269383 A1* | 9/2015 | Lang ....................... H04L 63/20 726/1 |
| 2016/0044057 A1* | 2/2016 | Chenette ................ H04L 63/20 726/1 |

(Continued)

OTHER PUBLICATIONS

Fundamental Practices for Secure Software Development, Mar. 2018, Third Edition, SAFECode (38 pages).

(Continued)

*Primary Examiner* — Joseph P Hirl
*Assistant Examiner* — Hassan Saadoun
(74) *Attorney, Agent, or Firm* — Ryan, Mason & Lewis, LLP

(57) ABSTRACT

Methods, apparatus, and processor-readable storage media for automated threat analysis of a system design are provided herein. An example method includes obtaining a design of a security architecture; analyzing the design to identify existing security controls in the architecture; in response to determining that the existing security controls fail to satisfy one or more mitigation criteria for mitigating at least one security threat: identifying one or more of at least one additional security control that mitigates the at least one security threat, and at least one change to at least one of the existing security controls that mitigates the at least one security threat; generating mitigation information indicative of one or more of the at least one additional security control and the changes; and revising the design based at least in part on the mitigation information.

20 Claims, 7 Drawing Sheets

(56) References Cited

U.S. PATENT DOCUMENTS

| | | | |
|---|---|---|---|
| 2016/0182559 A1* | 6/2016 | Francy | H04L 63/1425 |
| | | | 726/1 |
| 2017/0244748 A1* | 8/2017 | Krause | H04L 63/1425 |
| 2017/0330115 A1 | 11/2017 | Hankins | |
| 2018/0146004 A1* | 5/2018 | Belfiore, Jr. | G06F 21/577 |
| 2019/0205542 A1* | 7/2019 | Kao | G06Q 10/0635 |
| 2020/0073782 A1 | 3/2020 | Phoenix | |
| 2020/0159525 A1 | 5/2020 | Bhalla et al. | |
| 2020/0250316 A1 | 8/2020 | Rickerd et al. | |
| 2020/0267186 A1* | 8/2020 | Tarameshloo | G06N 5/003 |
| 2020/0278471 A1 | 9/2020 | Dixon et al. | |
| 2020/0364343 A1 | 11/2020 | Atighetchi et al. | |
| 2021/0264031 A1 | 8/2021 | Dhillon et al. | |

OTHER PUBLICATIONS

Dhillon, D., Developer-Driven Threat Modeling: Lessons Learned in the Trenches, IEEE Security & Privacy, May 12, 2011, pp. 41-47, vol. 9—Issue 4.

Information technology—Security techniques—Application security—Part 1: Overview and concepts, ISO/IEC FDIS 27034-1:2011(E), 2011.

K. Rindell and J. Holvitie, "Security Risk Assessment and Management as Technical Debt," 2019 International Conference on Cyber Security and Protection of Digital Services (Cyber Security), Oxford, United Kingdom, 2019, pp. 1-8, doi: 10.1109/ CyberSecPODS. 2019.8885100. (Year: 2019).

\* cited by examiner

US 11,206,284 B2

AUTOMATED THREAT ANALYSIS OF A SYSTEM DESIGN

FIELD

The field relates generally to information processing systems, and more particularly to techniques for providing security in such systems.

BACKGROUND

Threat modeling is a fundamental practice that is used to build resiliency into a system in order to reduce the system's vulnerability to common attacks. Generally, threat modeling includes analyzing a system's design to determine the ways that the system may be attacked so that those attacks can be mitigated through security controls (such as application security controls, for example). Existing approaches to threat modeling generally require extensive security and attack knowledge. Some tools are also available to help manage the threat modeling process. However, such tools have inefficient threat generation capabilities, resulting in excessive false positives which must be manually reviewed.

A need exists for improved techniques for automatically verifying that a security model implements the proper security controls.

SUMMARY

Illustrative embodiments of the disclosure provide techniques for automated threat analysis of a system design. An exemplary method includes analyzing the design to identify existing security controls in the architecture. Additionally, in response to determining that the existing security controls fail to satisfy one or more mitigation criteria for mitigating at least one security threat, such a method includes identifying one or more of at least one additional security control that mitigates the at least one security threat, and at least one change to at least one of the existing security controls that mitigates the at least one security threat. Such a method also includes generating mitigation information indicative of one or more of the at least one additional security control and the changes, and revising the design based at least in part on the mitigation information.

Illustrative embodiments can provide significant advantages relative to conventional threat modeling techniques. For example, challenges associated with excessive false positive rates of existing tools are overcome by combining a rules-based engine with threat modeling to automatically identify security controls within a system design and verify that such security controls are sufficient for mitigating potential threats. Security development expertise is built into the rules-based engine, which results in fewer (if any) false positives, thereby eliminating the time and costs required to manually review the findings.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
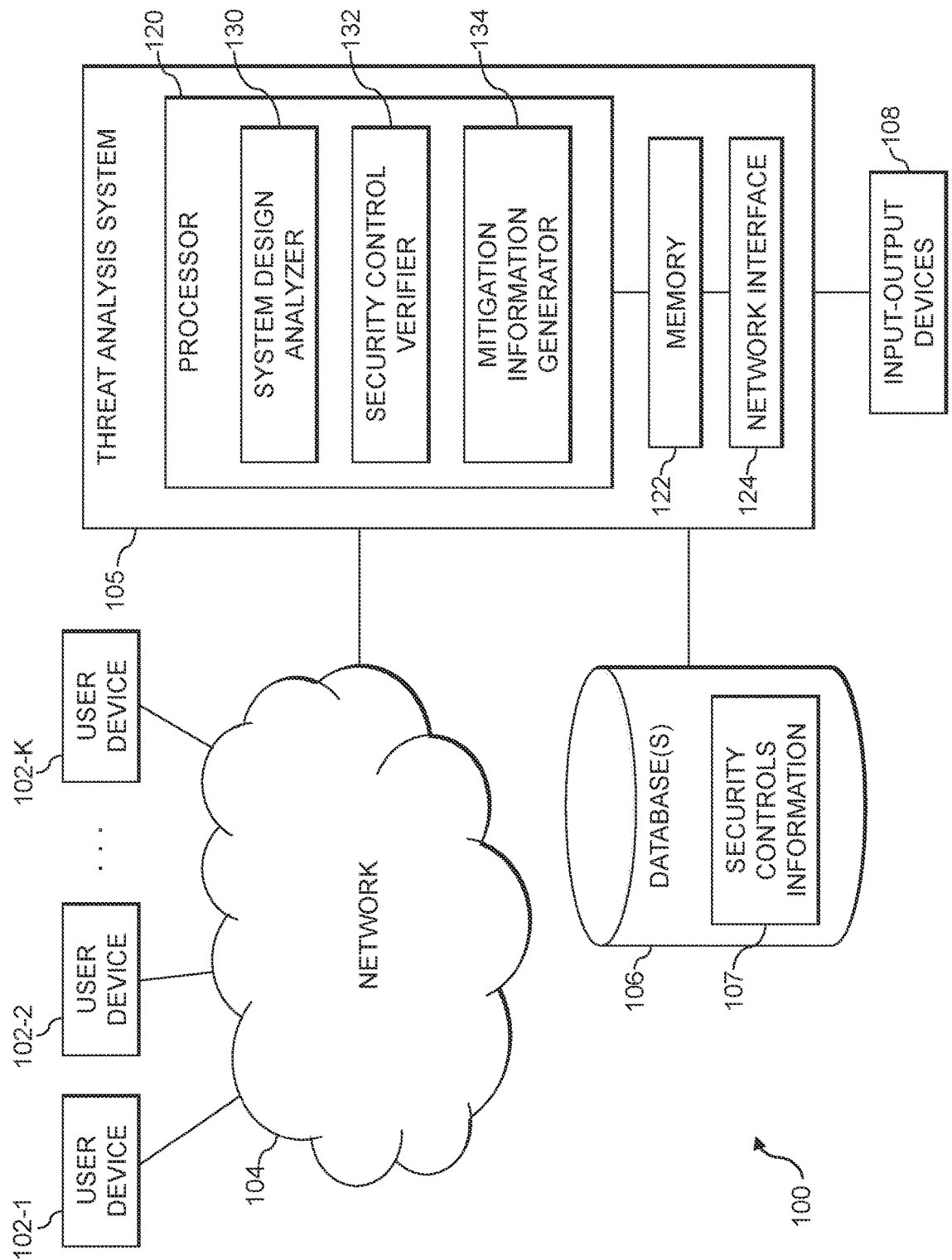
FIG. 1 shows an information processing system configured for automated threat analysis of a system design in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a threat analysis system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." The user devices 102 may include any suitable means for performing Human Computer Interaction.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, an ad hoc network, a point to point (P2P) protocol network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the threat analysis system 105 can have an associated database 106 configured to store data 107 pertaining to security controls, which comprise, for example, threat information and/or security control information. As discussed in more detail herein, the threat information includes applicability criteria for different types of threats and recommended mitigations for such threats, and the security control information may include applicability criteria for different security controls and verification steps for verifying the security controls. The database 106 in the present embodiment is implemented using one or more storage systems associated with the threat analysis system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the threat analysis system 105 are input-output devices 108, which illustratively comprise keyboards, displays or other types of input-output devices in any combination. Such input-output devices can be used, for example, to support one or more user interfaces to the threat analysis system 105, as well as to support communication between user devices 102, the threat analysis system 105, and other related systems and devices not explicitly shown.

The threat analysis system 105 in the FIG. 1 embodiment is assumed to be implemented using at least one processing device. Each such processing device generally comprises at least one processor and an associated memory, and implements one or more functional modules for controlling certain features of the threat analysis system 105.

More particularly, the threat analysis system 105 in this embodiment can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the threat analysis system 105 to communicate over the network 104 with the user devices 102, and illustratively comprises one or more conventional transceivers.

The processor 120 further comprises a system design analyzer 130, a security control verifier 132, and a mitigation information generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the system design analyzer 130, the security control verifier 132, and the mitigation information generator 134 may be implemented at least in part in the form of software that is stored in memory 122 and executed by processor 120.

It is to be understood that the particular set of elements shown in FIG. 1 for automated threat analysis of a system design involving threat analysis system 105 and user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing a system design analyzer 130, a security control verifier 132, and a mitigation information generator 134 of the threat analysis system 105 in computer network 100 will be described in more detail with reference to the flow diagram of FIG. 4. As noted above, threat modeling is an important process to identify weaknesses in system designs (also referred to as models) and to ensure controls are placed correctly to protect corresponding enterprises and users. As also noted herein, existing threat modeling tools (such as Microsoft® Threat Modeling Tool (TMT) and ThreatModeler™, for example) provide high false positive rates and require deep security and attack knowledge, which presents challenges for scaling these tools across development teams.

Accordingly, exemplary embodiments herein describe techniques for automated threat analysis that incorporate the concept of security controls into the diagramming aspect of threat modeling. As used herein, a "security control" refers to a mechanism that mitigates against a threat.

Figure 2:
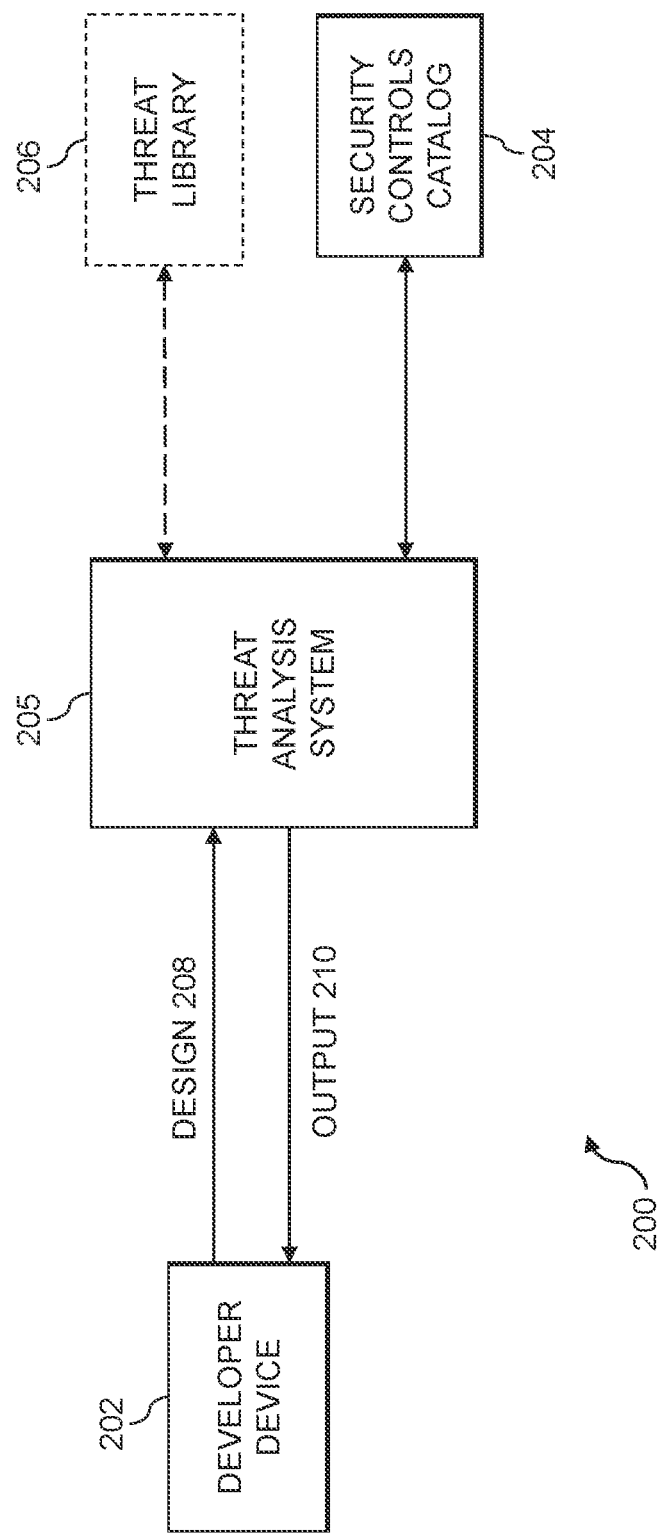
FIG. 2 shows a system architecture for automated threat analysis in accordance with an illustrative embodiment.

FIG. 2 shows a simplified system architecture 200 for automated threat analysis in accordance with one or more example embodiments. In this example, the system architecture 200 shows a threat analysis system 205 (e.g., corresponding to system 105 in FIG. 1) that receives input in the form of a design 208 of an architecture from a developer device 202. The design 208 may include, but is not limited to, one or more of data flow diagrams, sequence diagrams and subject object matrices that describe the architecture. In this example, the system architecture 200 also includes a security controls catalog (SCC) 204. The SCC 204 includes information pertaining to various security controls including, for example, criteria to identify whether or not security controls are relevant to the design 208, and verification steps to verify the security controls are functioning properly in the design 208.

The threat analysis system 205 communicates with SCC 204 to analyze the design 208 to identify relevant security controls. The analysis verifies that existing security controls are properly located in the design 208 and identifies locations in the design 208 where one or more additional security controls need to be implemented in order to mitigate against potential security threats. For example, the criteria of a security control related to encrypting sensitive information may include rules for identifying areas in the design 208 that store data in plaintext. As a non-limiting example, the SCC 204 may include the security controls defined in the Application Security Control catalog in the ISO 27034 standard, which is hereby incorporated by reference herein. Techniques described herein are also applicable to other types of designs (or combinations of such designs) such as, for example, security models related to crypto mathematical proofs, crypto compliance against a control, classifying sensitive information correctly using an entity relationship diagram, and crypto datablocks and payload.

Optionally, the system architecture 200 includes a threat library 206. The threat library 206 defines different types of security threats, and may include information useful to educate a developer on why a particular security control is necessary. For example, an entry in the threat library may include one or more of: an applicability field that helps developers determine whether the threat is relevant to their system, a detailed description of the threat, examples that illustrate the threat's implications, a baseline severity for the threat with an explanation of how the severity can vary on the basis of the system's details, detailed prescriptive threat mitigation, and guidance on how to verify mitigations.

The threat analysis system 205 provides output 210 to the developer device 202 based on the analysis. For example, the output 210 may notify the developer that the design 208 is secure or provide a score to indicate the security of the design 208. The output 210 may also include, for example, one or more of: a revised version of the design 208 showing changes to one or more security controls in the design 208, additional security controls required to secure the design 208, and locations within the design 208 to implement these changes and/or additions.

According to at least one embodiment, the threat analysis system 205 automatically generates a comprehensive verification strategy for the developer that includes, for example, a list of verification steps (e.g., test cases) for applicable security controls that can be performed once the security controls are in place. The verification steps ensure that a given security control is effective and does not contain weaknesses that allow it to be bypassed. These verifications steps may be performed throughout the software development lifecycle to ensure that the system is resilient.

Also, in at least one example embodiment, software code related to one or more components of the architecture can be provided to the threat analysis system 205, and the threat analysis system may analyze the software code to create the design 208 or add additional details to the design 208.

According to at least one example embodiment, the threat analysis system 205 may be implemented to train developers on threat modeling techniques using computer-based training. For example, the training may require a developer to correctly place security controls on a model of a system so as to mitigate potential threats to the system. The threat analysis system 205 verifies that the developer has sufficient understanding of the control depending on if the control is placed correctly. The model of the system may be created by the developer (e.g., as part of the training) or may be created beforehand.

It is to be appreciated that threat analysis system 205 and the developer device 202 may be implemented in a number of ways. For example, the developer device 202 may correspond to one of the user devices 102 in FIG. 1, such that the design 208 is created by the developer device 202 via a user input of a graphical user interface. The design 208 may then be communicated to the threat analysis system 205 for analysis. In other examples, the design 208 may be created and analyzed on the same device/system (e.g., threat analysis system 105). In at least one embodiment, the developer device 202 includes an integrated development environment (IDE) that implements at least a portion of the functionality corresponding to modules 130, 132, and/or 134 to allow for a correlated and integrated real-time analysis between conceptual and empirical models to educate developers and avoid costly coding errors.

Figure 3A:
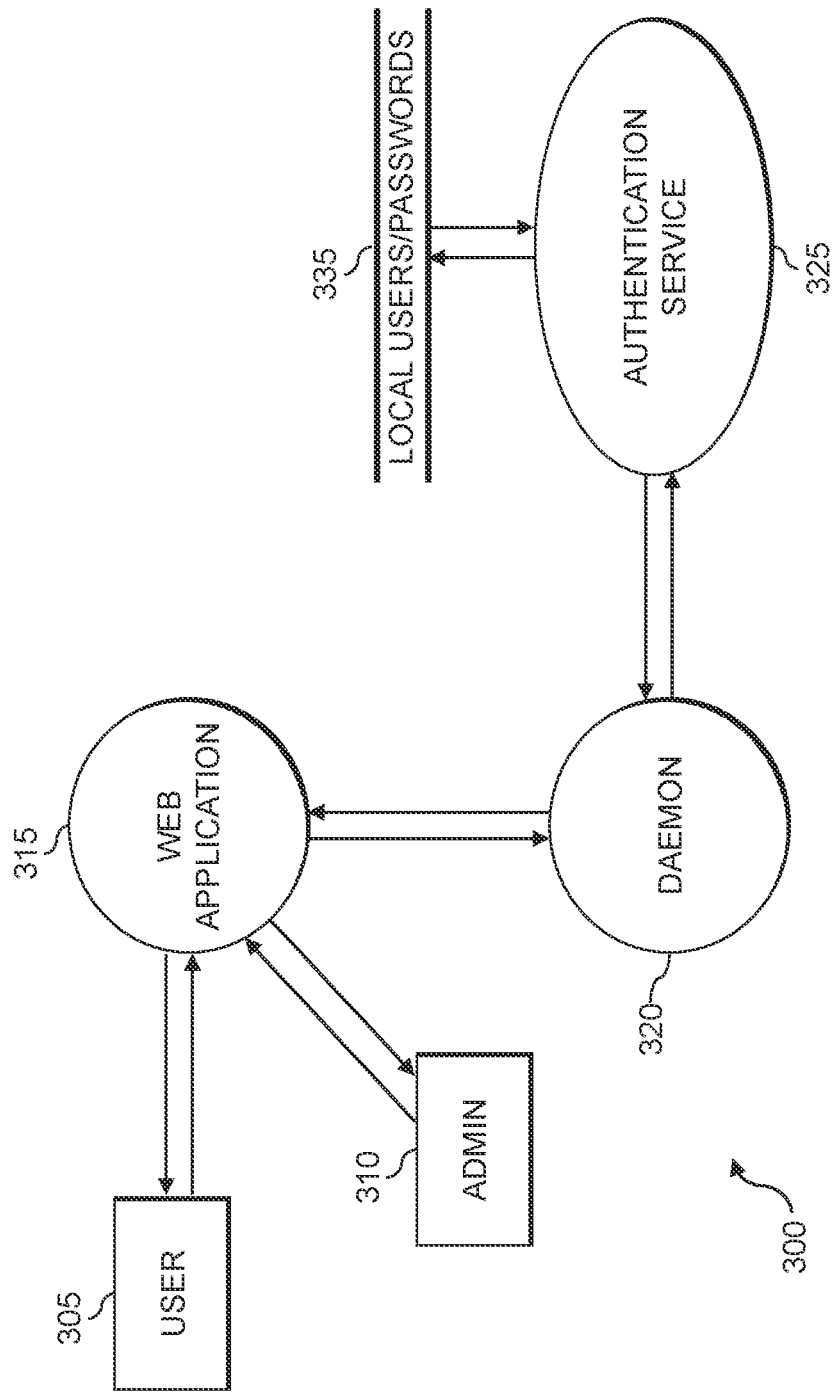
FIGS. 3A-3B show non-limiting examples of system designs in accordance with an illustrative embodiment.

FIG. 3A shows an example of a design 300 of a system architecture in accordance with illustrative embodiments. The design 300 shows various elements of the system architecture including a web application 315, a daemon 320, an AuthN (authentication) service 325, and a data store 335 that stores local user data and passwords. The design 300 also shows a user 305 and an admin 310 that interact with the web application 315. The arrows in the design 300 indicate data flows between the various elements. The design 300 represents a non-limiting example of at least a part of the input that can be provided to the threat analysis 105 system in accordance with one or more example embodiments.

Figure 3B:
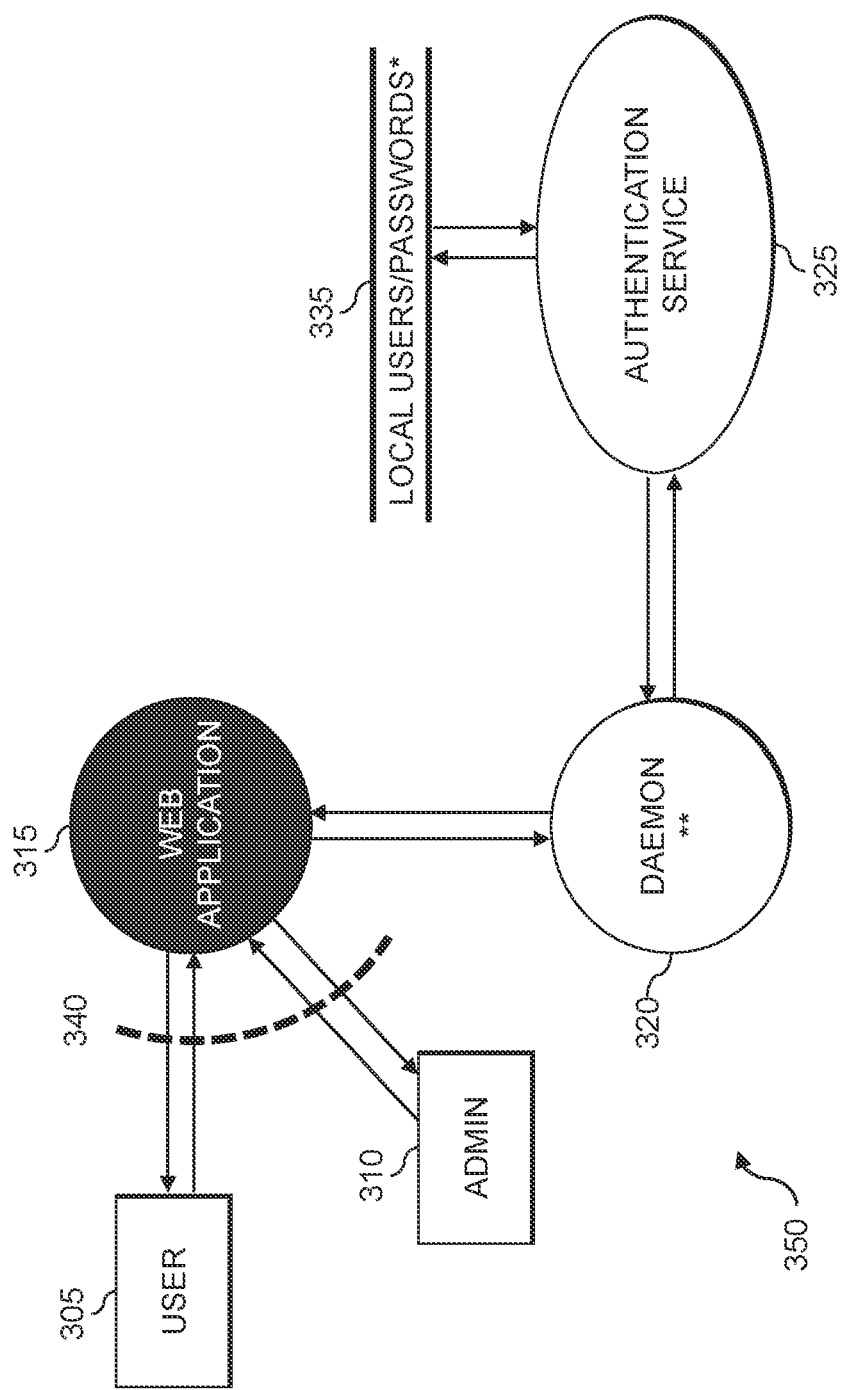

FIG. 3B shows a modified version 350 of the design 300 in accordance with illustrative embodiments. The modified version 350 represents a non-limiting example of at least a part of the output of the threat analysis 105 system in accordance with one or more example embodiments. In this example, the modified version 350 indicates various security protocols that should be implemented in order to protect against potential security threats. More particularly, in the modified version 350, the web application 315 is shaded to indicate one or more security controls are needed to protect against attacks on the web application (e.g., cross-site scripting, cross-site request forgery, hypertext transfer protocol (HTTP) response splitting, session fixation, etc.). Additionally, the dashed curved lined 340 indicates that communication between the web application 315, the user 305 and admin 310 needs to be secured (e.g., by requiring a hypertext transfer protocol secure (HTTPS) protocol). The modified version 350 also includes an asterisk to indicate that a security control is required to protect the data in the data store 335 (e.g., encrypting all data to prevent passwords and sensitive user data from being stored in plaintext). The double-asterisk ('**') corresponding to the daemon 320 may indicate that the daemon is written in an unmanaged language (e.g., C/C++) and a security control is needed to protect against, e.g., buffer overflows. The security control to mitigate that threat is, for example, static analysis and fuzzing component interfaces to ensure its resiliency.

It is noted that the designs 300 and 350 are simplified examples, and in one or more embodiments, such designs may be more complex. The format of the design 300 in FIG. 3 is also not intended to be limiting, and it is to be appreciated that it is possible to use other formats to describe the design 208, such as a text-only format, for example. Additional information relating to designs of architectures may be found, for example, in the following document: Dhillon, D., *Developer-Driven Threat Modeling: Lessons Learned in the Trenches*, IEEE Security & Privacy, May 12, 2011, pp. 41-47, Volume 9-Issue 4, which is hereby incorporated by reference in its entirety.

Figure 4:
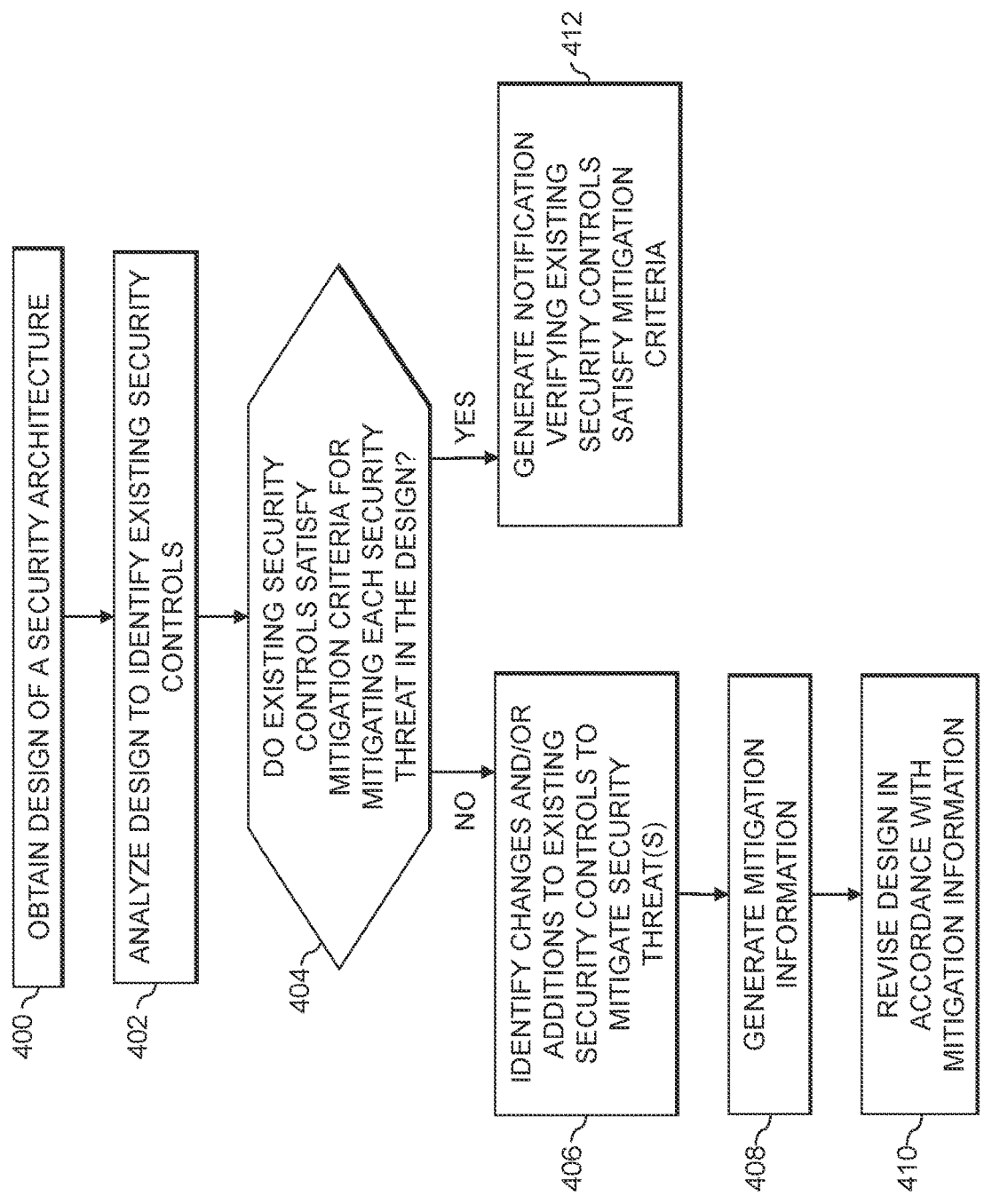
FIG. 4 is a flow diagram of a process for automated threat analysis of a system design in an illustrative embodiment.

FIG. 4 is a flow diagram of a process for automated threat analysis of a system design in an illustrative embodiment. It is to be understood that this particular process is only an example, and additional or alternative processes can be carried out in other embodiments.

In this embodiment, the process includes steps 400 through 412. These steps are assumed to be performed by the processor 120 utilizing its modules 130, 132, and 134.

Step 400 includes obtaining a design of a security architecture. The design may indicate at least one of one or more processes of the architecture, one or more dataflows within the architecture, a type of each of the dataflows; one or more of the existing security controls, and one or more storage data locations. The design may include at least one of one or more data flow diagrams, one or more sequence diagrams, and one or more subject-object matrices.

Step 402 includes analyzing the design to identify existing security controls in the architecture. The analyzing may include identifying the existing security controls based on a set of rules from a security control catalog.

Step 404 includes a test that determines whether the existing security controls satisfy one or more mitigation criteria for mitigating at least one security threat. The at least one security threat may correspond to a type of software weakness that is listed on the Common Weakness Enumeration (CWE). If the result of the test at step 404 is 'no,' then the process continues to steps 406-410.

Step 406 includes identifying one or more of at least one additional security control that mitigates the at least one security threat, and at least one change to at least one of the existing security controls that mitigates the at least one security threat.

Step 408 includes generating mitigation information indicative of one or more of the at least one additional security control and the changes. The mitigation information may include a modified design of the architecture, wherein the modified design includes one or more of the at least one additional security control, and the changes to at least one of the existing security controls. The mitigation information may include a location within the architecture to implement the at least one additional security control. The mitigation information may also include a new location within the architecture to implement the at least one of the existing security controls.

Step 410 includes revising the design based at least in part on the mitigation information.

If the result of the test at step 404 is 'yes,' then the process continues to step 412, which includes generating a notification that verifies the existing security controls satisfy the one or more mitigation criteria for each security threat in the design.

Additionally, the process in FIG. 4 may further include a step of generating a notification indicating the obtained design is complete in response to determining that the existing security controls satisfy the one or more mitigation criteria for each identified security threat. The process may also include a step of generating educational information corresponding to at least one of the at least one security threat, the at least one additional security control, and the one or more of the existing security controls.

The process may also include a step of automatically generating one or more test cases for each of the identified at least one additional security control and/or the existing security controls to verify the one or more mitigation criteria are satisfied. The one or more test cases may be periodically performed during a software development lifecycle of the architecture.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide an automated means to identify threats, verify appropriate security controls are in a system design, and generate an efficient verification strategy to ensure that the security controls sufficiently mitigate the threat. These and other embodiments can effectively reduce or eliminate false positives as compared to existing tools. Additionally, some embodiments are configured to automatically generate tests from the design of the architecture. These test cases can be run throughout the software development lifecycle to ensure the proper security controls are in place, thus improving the overall security of the system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
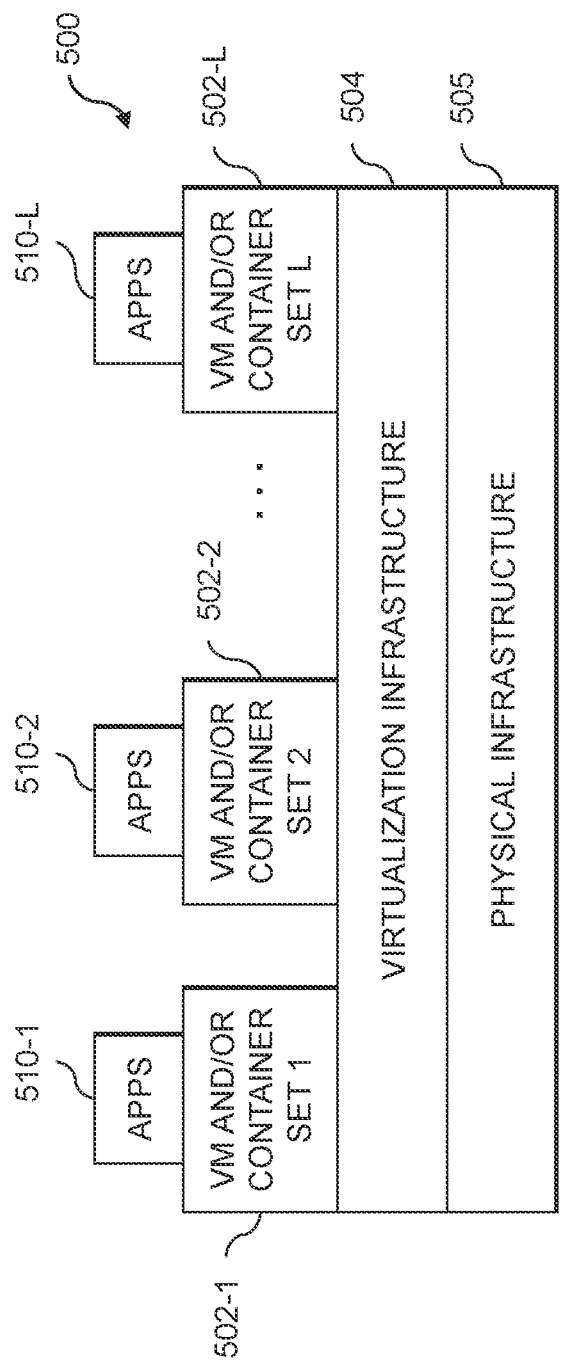
FIGS. 5 and 6 show examples of processing platforms that may be utilized to implement at least a portion of an information processing system in illustrative embodiments.
Figure 6:
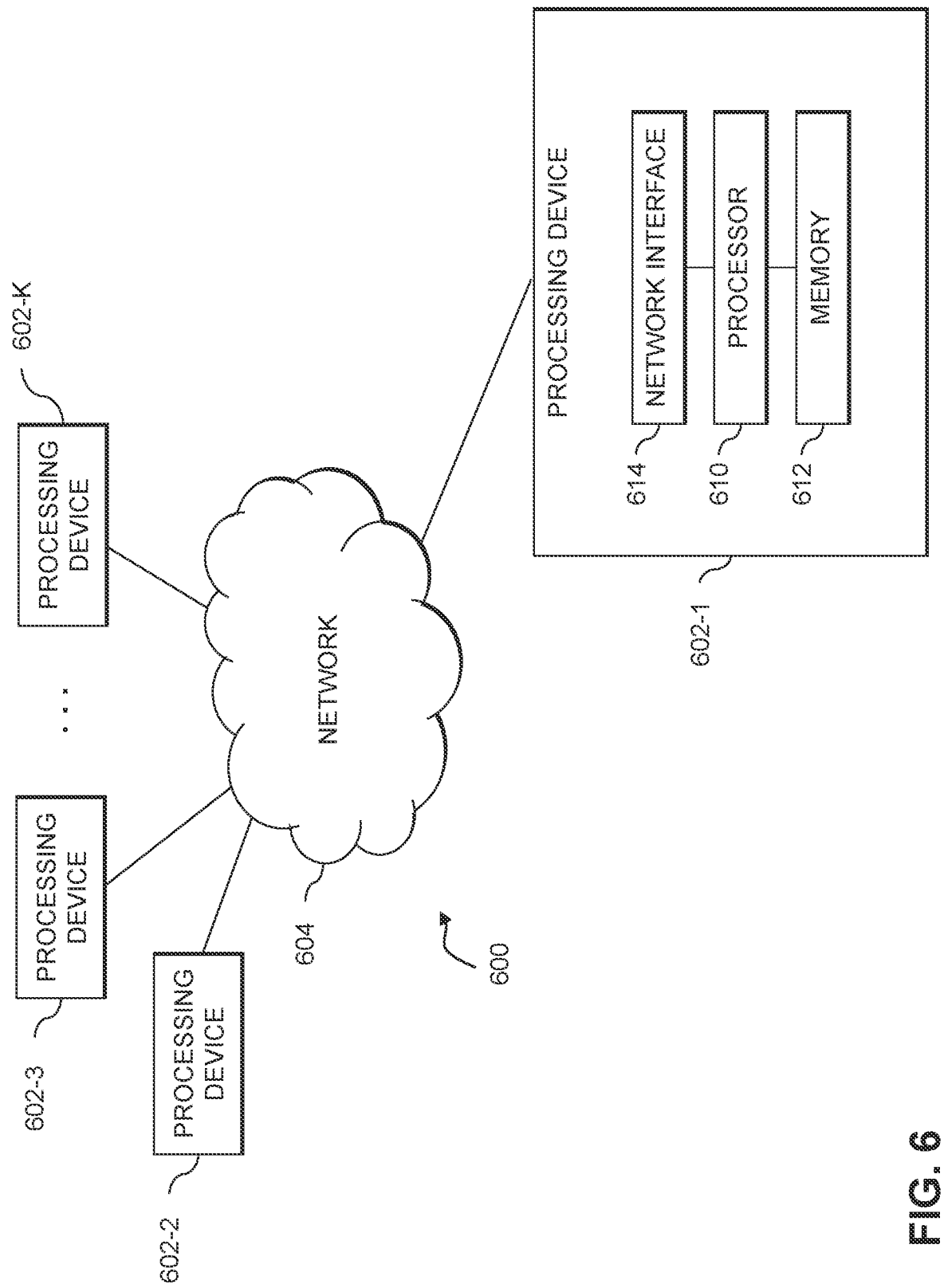

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform used to implement a hypervisor within the virtualization infrastructure 504 is the VMware® vSphere® which has an associated virtual infrastructure management system such as the VMware® vCenter™. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining a design of a security architecture;
analyzing said design to identify existing security controls in said architecture; and
in response to determining that said existing security controls fail to satisfy one or more mitigation criteria for mitigating at least one security threat:
identifying one or more of at least one additional security control that mitigates said at least one security threat, and at least one change to at least one of the existing security controls that mitigates said at least one security threat;
generating mitigation information indicative of one or more of said at least one additional security control and said changes; and
revising said design based at least in part on said mitigation information;
wherein the method is performed by at least one processing device comprising a processor coupled to a memory.

2. The computer-implemented method of claim 1, wherein said design indicates at least one of:
one or more processes of said architecture;
one or more dataflows within said architecture;
a type of each of said dataflows;
one or more of the existing security controls; and
storage data locations.

3. The computer-implemented method of claim 2, wherein said design comprises at least one of:
one or more data flow diagrams;
one or more sequence diagrams; and
one or more subject-object matrices.

4. The computer-implemented method of claim 1, wherein the mitigation information comprises a modified design of said architecture, wherein the modified design comprises one or more of:
the at least one additional security control; and
the changes to at least one of the existing security controls.

5. The computer-implemented method of claim 1, wherein said mitigation information comprises:
a location within said architecture to implement the at least one additional security control.

6. The computer-implemented method of claim 1, wherein said mitigation information comprises:
a new location within said architecture to implement the at least one of the existing security controls.

7. The computer-implemented method of claim 1, wherein said analyzing comprises:
identifying said existing security controls based on a set of rules from a security control catalog.

8. The computer-implemented method of claim 1, further comprising:
in response to determining that said existing security controls satisfy the one or more mitigation criteria for each identified security threat, generating a notification indicating said obtained design is complete.

9. The computer-implemented method of claim 1, further comprising:
generating educational information corresponding to at least one of the at least one security threat; the at least one additional security control; and the one or more of the existing security controls.

10. The computer-implemented method of claim 1, further comprising:
automatically generating one or more test cases for each of the identified at least one additional security control and/or the existing security controls to verify said one or more mitigation criteria are satisfied.

11. The computer-implemented method of claim 10, further comprising:
periodically performing said one or more test cases during a software development lifecycle of said architecture.

12. The computer-implemented method of claim 1, wherein the at least one security threat corresponds to a type of software weakness that is listed on the Common Weakness Enumeration (CWE).

13. A non-transitory processor-readable storage medium having stored therein program code of one or more software programs, wherein the program code when executed by at least one processing device causes the at least one processing device:
to obtain a design of a security architecture;
to analyze said design to identify existing security controls in said architecture; and
in response to a determination that said existing security controls fail to satisfy one or more mitigation criteria for mitigating at least one security threat:
to identify one or more of at least one additional security control that mitigates said at least one security threat, and at least one change to at least one of the existing security controls that mitigates said at least one security threat;

to generate mitigation information indicative of one or more of said at least one additional security control and said changes; and to revise said design based at least in part on said mitigation information.

14. The non-transitory processor-readable storage medium of claim 13, wherein said design indicates at least one of:

one or more processes of said architecture;
one or more dataflows within said architecture;
a type of each of said dataflows;
one or more of the existing security controls; and
storage data locations.

15. The non-transitory processor-readable storage medium of claim 13, wherein the mitigation information comprises at least one of:

a modified design of said architecture, wherein the modified design comprises one or more of the at least one additional security control and the changes to at least one of the existing security controls;

a location within said architecture to implement the at least one additional security control; and a new location within said architecture to implement the at least one of the existing security controls.

16. The non-transitory processor-readable storage medium of claim 13, wherein the analysis of said design comprises:

identifying said existing security controls based on a set of rules from a security control catalog.

17. The non-transitory processor-readable storage medium of claim 13, wherein the program code when executed by the at least one processing device further causes the at least one processing device:

to automatically generate one or more test cases for each of the identified at least one additional security control and/or the existing security controls to verify said one or more mitigation criteria are satisfied; and to periodically perform said one or more test cases during a software development lifecycle of said architecture.

18. An apparatus comprising:

at least one processing device comprising a processor coupled to a memory;

the at least one processing device being configured:

to obtain a design of a security architecture;
to analyze said design to identify existing security controls in said architecture; and
in response to a determination that said existing security controls fail to satisfy one or more mitigation criteria for mitigating at least one security threat:
to identify one or more of at least one additional security control that mitigates said at least one security threat, and at least one change to at least one of the existing security controls that mitigates said at least one security threat;
to generate mitigation information indicative of one or more of said at least one additional security control and said changes; and
to revise said design based at least in part on said mitigation information.

19. The apparatus of claim 18, wherein the mitigation information comprises at least one of:

a modified design of said architecture, wherein the modified design comprises one or more of the at least one additional security control and the changes to at least one of the existing security controls;

a location within said architecture to implement the at least one additional security control; and a new location within said architecture to implement the at least one of the existing security controls.

20. The apparatus of claim 18, the at least one processing device being further configured:

to automatically generate one or more test cases for each of the identified at least one additional security control and/or the existing security controls to verify said one or more mitigation criteria are satisfied; and to periodically perform said one or more test cases during a software development lifecycle of said architecture.

* * * * *